March 16, 1937.    D. E. WILLIAMS ET AL    2,073,980
BATTERY TERMINAL CLAMP
Filed May 31, 1935
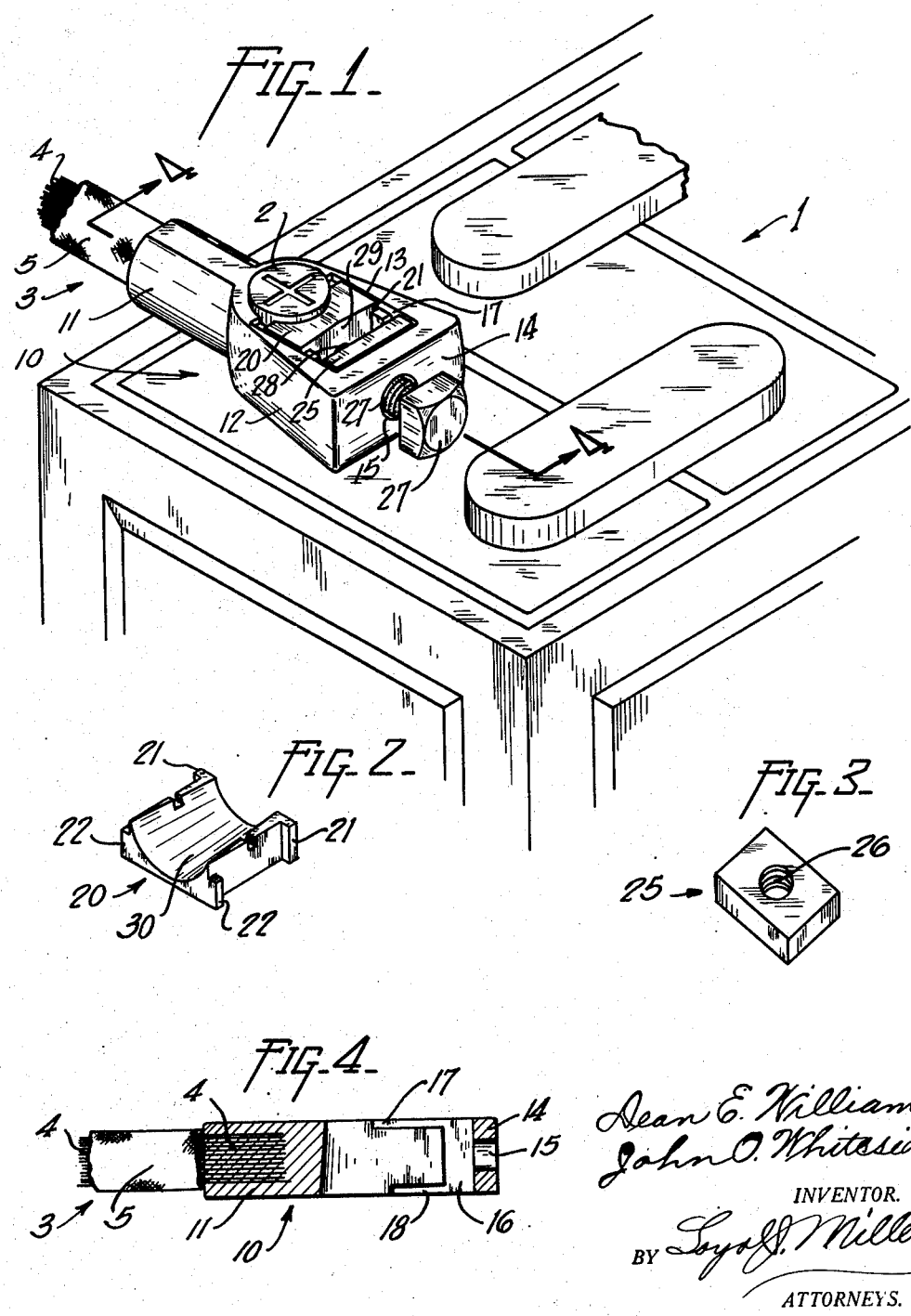

Patented Mar. 16, 1937

2,073,980

UNITED STATES PATENT OFFICE 2,073,980

BATTERY TERMINAL CLAMP

Dean E. Williams and John O. Whiteside, Oklahoma City, Okla., assignors to General Battery Supply Company, Oklahoma City, Okla., a corporation of Oklahoma Application May 31, 1935, Serial No. 24,258

5 Claims. (Cl. 173—259)

Our invention relates to clamps for connecting a conductor of electricity to the post of a usual storage battery.

The prime object of the invention is the provision of a clamp for the purpose described which is so designed that it may be constructed of a soft, non-corrosive material such as lead and yet have sufficient strength to positively engage the battery post.

At the present time usual clamps used for this purpose are constructed of a hard metal subject to corrosion by action of the electrolyte of the battery. This is done in order to embody sufficient strength to positively engage the battery post. Previous attempts have been made to construct cable clamps and connectors of lead in order to prevent corrosion, but so far as we know or have been able to ascertain they have lacked sufficient strength to accomplish a positive connection with a battery post.

Other objects of the invention are to provide a device of the class described which is new, novel, practical and of utility; which has a range of adjustment sufficient to connect battery posts of various and usual sizes; which is so designed that positive engagement may be had with tapered battery posts, battery post round in cross-section, and also those which are deformed or are angular in cross-section; which positively prevents all corrosion; the moving parts of which are removable and replaceable; which may be quickly installed; which is economical to manufacture; which is durable; and, which will be efficient in accomplishing all the purposes for which it is intended.

With these and other objects in view as will more fully appear hereinbelow, our invention consists in the construction, novel features, and combination of parts hereinafter more fully described, pointed out in the claims hereto appended, and illustrated in the accompanying one-sheet drawing, of which, Figure 1 is a fragmentary perspective view of a conventional storage battery showing our device operatively installed thereon;

Figure 2 is a perspective view of the follower or clamping element of the device;

Figure 3 is a perspective view of a nut which assists in actuating the follower; and, Figure 4 is a sectional view of the yoke or stirrup-shaped element of the device, taken substantially along the line 4—4 of Fig. 1.

Like characters of reference designate like parts in all the figures.

It is understood that various changes in the form, proportion, size, shape, weight and other details of construction, within the scope of our invention may be resorted to without departing from the spirit or broad principle of our invention and without sacrificing any of the advantages thereof; and it is also understood that the drawing is to be interpreted as being illustrative and not restrictive.

The inventive idea involved is capable of receiving a variety of mechanical expressions one of which, for the purpose of illustrating the invention, is shown in the accompanying drawing wherein:—

The reference numeral 1 indicates as a whole a conventional storage battery having a usual upstanding post or terminal 2 to which an electric conductor or cable 3 is to be connected. The cable 3 usually consists of a plurality of wires 4 surrounded or encased by insulation 5.

Our clamp consists substantially of a closed ended yoke or substantially stirrup-shaped element 10 having at one end a preferably cylindrical projection 11 which is fused to the end portions of the wires 4 and which preferably extends over the adjacent end portion of the insulation 5. The yoke 10 includes two side legs 12 and 13 which are preferably integral at one end with the projection 11 and the other ends of which are connected together by a crossmember or bridge 14 which preferably is made integral with the legs. Intermediate its ends the bridge 14 is provided with a through perforation 15.

The inner surface of each of the legs 12 and 13 are provided adjacent the inner surface of the bridge 14 with a transverse superficial groove 16 one end of which is in communication with a longitudinally extending superficial groove 17 and the other end of which communicates with a second and shorter longitudinally extending superficial groove 18. The long and short grooves 17 and 18 are arranged upon both legs 12 and 13 so that they occur upon similar sides of the legs. A pocket is thus formed adjacent the inner surface of the bridge 14.

A follower or clamping element 20, best seen in Fig. 2, having laterally projecting side flanges 21 at one end and having flanges 22 at its other end similar to flanges 21 except that they are shorter in length, is slidably disposed within the yoke 10 with the longer flanges 21 disposed within the longer grooves 17 and with the shorter flanges 22 within the shorter grooves 18. The flanges 22 are of a length slightly less than width of the transverse groove 16 and the follower can therefore be placed in operative position in the yoke by inserting its end which bears the flanges 22 through the groove 16 until the flanges 22 are in alinement with the grooves 18, and then moving it slightly away from the inner face of the bridge 14. When in this position, the follower cannot be removed from the yoke due to the flanges 21 and 22 without first moving it out of the grooves 17 and 18 into the groove 16, and then moving the follower longitudinally of the groove 16.

A nut 25 of a dimension suitable to substantially fill the pocket formed by the groove 16 and having a central threaded perforation 26 is disposed within the groove 16 and a threaded thrust-bolt 27 is passed freely through the perforation 15 in bridge 14 and is threadedly engaged within the perforation 26. The free end 28 of the bolt 27 bears against the adjacent end 29 of the follower 20 and urges it away from the bridge 14.

The face of the follower 20 which lies most remote from the bridge 14 is provided with an arcuate groove 30 which is of a radius approximating the radius of a usual battery post.

It is intended to construct the element 10 and follower 20 of a lead composition which is noncorrosive, and to construct the nut 25 and bolt 27 of any desired material such as iron or steel. Since the follower at all times prevents contact of the bolt or nut with the post 2, it is not necessary that they be made of non-corrosive material.

It may readily be seen (Fig. 1), that in operation, the nut 25 is drawn by the bolt into engagement with the inner surface of the bridge 14, and that by rotating the bolt 27 its end 28 is driven by the nut into engagement with the follower which in turn is urged to a clamping engagement with the post 2. Also, that regardless of the cross-section form of the post, a positive engagement may be had even though its transverse dimension varies.

In the drawing herein, the follower 20 and the end of the element 10 lying nearest the projection 11 are illustrated as being formed to fit a tapered post. This is preferable although not compulsory.

Obviously, the invention is susceptible of embodiment in forms other than that which is illustrated in the accompanying drawing and described herein, and applicable for uses and purposes other than as detailed, and we therefore consider as our own all such modifications and adaptations and other uses of the form of the device herein described as fairly fall within the scope of our invention.

Having thus described our invention, what is claimed and desired to be secured by Letters Patent, is:

1. In a battery terminal connector, a yoke of soft non-corrosive metal having two side members and adapted at one closed end for connection to an electrical conductor, said yoke having a transverse opening therethrough for receiving a battery terminal, a screw of a harder material, a bridge at the other end of the yoke having a bore for freely receiving said screw, a rectangular pocket within the opening adjacent the inner surface of said bridge, oppositely disposed longitudinally extending guide grooves leading from said pocket and extending toward the terminal receiving end of the opening at both edges of both of said side members, a nut of a hard metal threaded upon said screw, and a follower of soft non-corrosive metal slidable within the opening toward and away from said terminal and actuated by said screw, said follower comprised of: a rectangular block having a plane surface and an opposite arcuately grooved terminal engaging surface, the side edges of said block each having projecting flanges for slidable engagement within said guide grooves, two of said flanges being sufficiently short in length to permit their passage through the pocket and into registration with two of the guide grooves, said follower being held against inadvertent removal from the yoke by the presence of the nut within the pocket.

2. In a battery connector, the combination with a metal yoke having two side members, one end member connecting similar ends of the side members and adapted for connection to an electrical conductor, and a bridge connecting the opposite ends of the side members, said yoke having an opening between the side and end members for receiving a battery terminal, of guide grooves extending longitudinally along both inner edges of both of the side members, a rectangular pocket within the opening parallel with and adjacent the inner surface of said bridge and communicating with said guide grooves, a slidable follower within said opening including a rectangular block having an arcuate terminal engaging surface, the side edges of said block each having projecting flanges for slidable engagement within said guide grooves, two of said flanges being sufficiently short in length to permit their passage through the pocket and into registration with two of the guide grooves, a rectangular nut within said pocket and acting to prevent removal of the follower, and a screw passing freely through the bridge, threadedly engaged with the nut, and acting to move the follower in a direction away from the bridge.

3. In a terminal connector: a cable connecting portion; an arcuate terminal receiving portion; an end bridge portion spaced from and opposite said terminal receiving portion; two side members spaced apart and each connecting one end of said terminal receiving portion and one end of said bridge; an inwardly projecting guide rib on the inner surface of each of said side members extending from said terminal receiving portion to a point short of said bridge, and forming a substantially rectangular pocket between their ends and said bridge; a follower member having a groove in each of its sides to co-act with said guide ribs, and having one arcuate surface to co-act with said terminal receiving portion, one of its edges being adapted to enter said pocket to permit engagement of its grooves with the guide ribs of said side members; an adjusting screw freely rotatable through a perforation in said bridge; a nut in said rectangular pocket, substantially the size of the pocket, adapted to co-act with said screw; said screw adapted to move said follower longitudinally along said guide ribs toward said terminal receiving portion; and said nut adapted to distribute the force equally along the inner surface of said bridge, and to prevent the inadvertent removal of said follower from its operative position.

4. A battery terminal connector comprising a yoke of soft noncorrosive metal having parallel side members and adapted to be connected to an electrical conductor, said yoke having one end thereof shaped to form a seat for a battery terminal, a bridge connecting said side members and having a bore therethrough, a follower of non-corrosive metal slidable between said members toward and from said seat, means formed on said members and follower for guiding the follower in its sliding movements, a nut in said yoke adjacent the bridge thereof, and an adjusting screw extending through the bore and carried by said nut with one end thereof in contact with said follower, said nut and screw cooperating with said guiding means to lock the follower against removal from the connector when the screw is in contact with said follower.

5. A battery terminal connector having parallel sides and closed ends, and having one of said ends shaped to form a seat for a terminal, a follower slidable between said sides toward and from said seat, means formed on said sides and follower for guiding the follower in its sliding movements, and means detachably mounted on said connector for engaging and moving said follower along said guiding means toward said seat and cooperating with said guiding means for locking the follower against removal from said connector.

DEAN E. WILLIAMS.
JOHN O. WHITESIDE.